(12) United States Patent
Shen

(10) Patent No.: US 6,424,253 B1
(45) Date of Patent: Jul. 23, 2002

(54) VEHICLE PROTECTION SYSTEM AND DEVICE

(75) Inventor: Zhi Jian Shen, Jiang Su (CN)

(73) Assignee: Mong Chew Goh, Singapore (SG)

( * ) Notice: Subject to any disclaimer, the term of this patent is extended or adjusted under 35 U.S.C. 154(b) by 0 days.

(21) Appl. No.: 09/521,571

(22) Filed: Mar. 9, 2000

(30) Foreign Application Priority Data

Jan. 11, 2000 (CN) ...................................... 200000012-5

(51) Int. Cl.[7] .............................................. B60R 25/10
(52) U.S. Cl. ...................................... 340/426; 340/428
(58) Field of Search ................................. 340/426, 428, 340/438, 825.04

(56) References Cited

U.S. PATENT DOCUMENTS

| | | | | |
|---|---|---|---|---|
| 3,834,484 A | * | 9/1974 | Sangster ..................... | 180/114 |
| 4,992,683 A | * | 2/1991 | Garretto et al. ............. | 180/287 |
| 5,193,641 A | * | 3/1993 | Durrell ........................ | 180/287 |
| 5,448,218 A | * | 9/1995 | Espinosa ..................... | 340/426 |
| 5,559,493 A | * | 9/1996 | Karnwie-Tuah ............. | 340/426 |

* cited by examiner

*Primary Examiner*—Jeffery Hofsass
*Assistant Examiner*—Son Tang
(74) *Attorney, Agent, or Firm*—Ladas & Parry

(57) ABSTRACT

An anti-theft device (2) for a vehicle. The device (2) comprises a valve means (2D) and a control means (2A,2B, 2C). The valve-means (2D) is operable to open and close a fuel supply line of a vehicle thereby respectively preventing and permitting fuel flow through said fuel supply line. The valve means (2D) opens in response to an electrical current supply and closes in response to the lack of an electrical current supply. The control means (2A, 2B, 2C) selectively enables and disables said electrical current supply to the valve means (2D). The control means (2A,2B,2C) enables said electrical current supply in response to receiving a specific encoded signal, and disables said electrical current supply at other times.

18 Claims, 3 Drawing Sheets

VEHICLE PROTECTION SYSTEM AND DEVICE

FIELD OF THE INVENTION

The present invention relates to a vehicle protection system and device which controls and prevents abnormal and/or unauthorised functioning of the motor vehicle's parts by controlling the battery power supply transmission directly from the battery and fuel tank fuel supply directly from the fuel tank.

PRIOR ART

Prior art vehicle anti-theft protection systems use various means to immobilise a vehicle. These usually involve cutting off power supply to the vehicle parts or preventing fuel supply when the car is parked. Alternatively, the vehicle's parking brakes may be activated. A control device is usually placed between the main relay and the engine control unit. Upon receipt of a correct enabling code, the control device will reverse the immobilisation device. The disadvantage of such systems thus far is that such an apparatus can be tampered with by re-wiring or changing of part of the wiring, by for example, connecting the battery to the engine control unit and by-passing the control device. Thus their reliability is reduced.

In U.S. Pat. No. 5,559,493 there is described an automobile anti-theft device which is connected to the electrical system and the fuel line of the system. This device includes an anti-theft system designed to prevent opening of a pre-existing valve in the fuel supply line, unless the correct code is entered. However, this anti-theft device can be defeated by providing an electrical connection direct from the automobile battery to the pre-existing valve.

SUMMARY OF THE INVENTION

The objective of the system of the present invention is to improve upon devices which only control and prevent abnormal and/or unauthorised functioning based upon the power supply, so as to make the device more comprehensive and reliable.

Broadly, in one aspect, the present invention involves disabling the fuel supply from the fuel tank to the engine and also disabling the supply of electrical power from the vehicle battery, unless the correct activation code is received. The operator could enter the activation code in a number of ways, for example, by a key or a keypad.

According to one aspect of the invention there is provided an anti-theft device for a vehicle, comprising: a valve means operable to open and close a fuel supply line of a vehicle thereby respectively preventing and permitting fuel flow through said fuel supply line, the valve means opening in response to an electrical current supply and closing in response to the lack of an electrical current supply; and a control means for selectively enabling and disabling said electrical current supply to the valve means, the control means enabling said electrical current supply in response to receiving a specific encoded signal, and disabling said electrical current supply at other times.

Preferably, the anti-theft device further comprises a fuel supply control line adapted to be disposed in fuel supply line of a vehicle, and the valve means is arranged to control fuel flow through said fuel supply control line.

Desirably, the control means enables said electrical current supply in response to a specific start-up encoded signal. In a preferred embodiment, the control means comprises a power control unit adapted to enable the electrical current supply to the valve means in response to an activation signal; and an encoded signal control unit adapted to generate said activation signal and to transmit the activation signal to the power control unit in response to receiving said specific start-up encoded signal.

It is also desirable that the control means disables said electrical current supply in response to a specific shut-down encoded signal. In a preferred embodiment, the power control unit is adapted to disable the electrical current supply to the valve means in response to a deactivation signal; and the encoded signal control unit is adapted to generate said deactivation signal and to transmit the deactivation signal to the power control unit in response to receiving said specific shut-down encoded signal.

Preferably, the encoded signal control unit includes a receiver for receiving an encoded signal, storage means for storing a representation of said specific start-up encoded signal, a comparator for comparing a received signal with the representation of the specific start-up encoded signal in the storage means, and a signal generator for generating the activation signal when the comparator has determined that the received encoded signal is identical to the representation of the specific start-up encoded signal.

The storage means may also store a representation of said specific shut-down encoded signal, and the comparator may also compare the received signal with the representation of the specific shut-down encoded signal in the storage means, and the signal generator may generate the deactivation signal when the comparator has determined that the received encoded signal is identical to the representation of the specific shut-down encoded signal.

The source of electrical power In the vehicle will usually be a vehicle battery, in which case, the control means may be adapted to be placed in electrical contact with the vehicle battery, whereby the electrical current supply is provided by the vehicle battery.

In a preferred embodiment, the control means is adapted to be placed in electrical communication with at (east one other electrically operated component of the vehicle, whereby the control means can control the electrical supply to the or each other component. The other component may be, for example, an engine control unit or an indicator light.

It is preferred-that-the anti-theft device further comprises a tamper-proof using within which the valve means and the control means are housed.

The anti-theft device may further comprise a start-up unit for generating and transmitting the specific encoded signal The start-up unit may include a transponder for generating and transmitting the specific encoded signal in the form of a radio wave. The start-up unit may be activated by any suitable means, such as a mechanical key or by the entry of a code into a keypad, and so on.

The valve means may be any suitable form of valve. A conventional magnetic valve, such as solenoid valve is usually convenient.

According to another aspect of the invention there is provided a vehicle incorporating an anti-theft device as described above. The vehicle would typically include a battery, a fuel tank and an engine, and the anti-theft device would be disposed in the fuel line from the fuel tank to the engine, whereby the anti-theft device could control the fuel supply to the engine. The anti-theft device would also control the electrical supply from the vehicle battery to the valve means of the anti-theft device, and preferably would additionally control the electrical supply from the vehicle battery to other components of the vehicle, such as an engine management system and/or indicator lights.

The anti-theft device according to the invention is particularly suitable for use with automobiles. The anti-theft device may be pre-installed in the vehicle, or may be supplied separately for retrofitting to the vehicle.

According to another aspect of the invention there is provided a method of preventing unauthorised use of a vehicle comprising installing a valve means in the fuel supply line of the vehicle between a fuel tank and an engine of the vehicle, the valve means being operable, by an electrical current from a battery of the vehicle, to permit fuel flow from the fuel tank to the engine; and controlling the supply of electrical current from the battery to the valve means such that the supply is only provided in response to a specific encoded signal, whereby fuel can be supplied to the engine only in response to receipt of said specific encoded signal.

Preferably, the electrical supply to at least one other electrical component of the vehicle is also controlled such that the battery is placed in electrical contact with the or each other component only in response to receipt of said specific encoded signal.

Broadly, in another aspect, the invention involves inserting an anti-theft device into a fuel supply line of a vehicle, the anti-theft device comprising a housing containing a valve to prevent fuel flow through the device, unless the correct activation code Is received.

According to another aspect of the invention there is provided an anti-theft device for a vehicle, comprising; a housing; a fuel supply control line disposed in the housing and adapted to be disposed in a fuel supply line of a vehicle; a valve means disposed in the housing, the valve means being operable to open and close the fuel supply control line thereby respectively permitting and preventing fuel flow through said fuel supply control line; and a control means disposed in the housing, the control means selectively opening and closing the valve means in response to receiving a specific encoded signal.

Preferably, the valve means opens in response to an electrical current supply and closes in response to the lack of said electrical current supply, and the control means selectively enables and disables said electrical current supply to the valve means, the control means enabling said electrical current supply in response to receiving said specific encoded signal, and disabling said electrical current supply at other times.

Preferably, the housing Is substantially tamper proof. To this end, the housing is preferably made of a strong, durable material that is not easily broken. A number of plastics and metallic materials would be suitable.

The invention is now described in more detail in relation to the preferred embodiment of the invention, with reference to the accompanying drawings.

DETAILED DESCRIPTION OF THE PREFERRED EMBODIMENT OF THE PRESENT INVENTION

Figure 1:
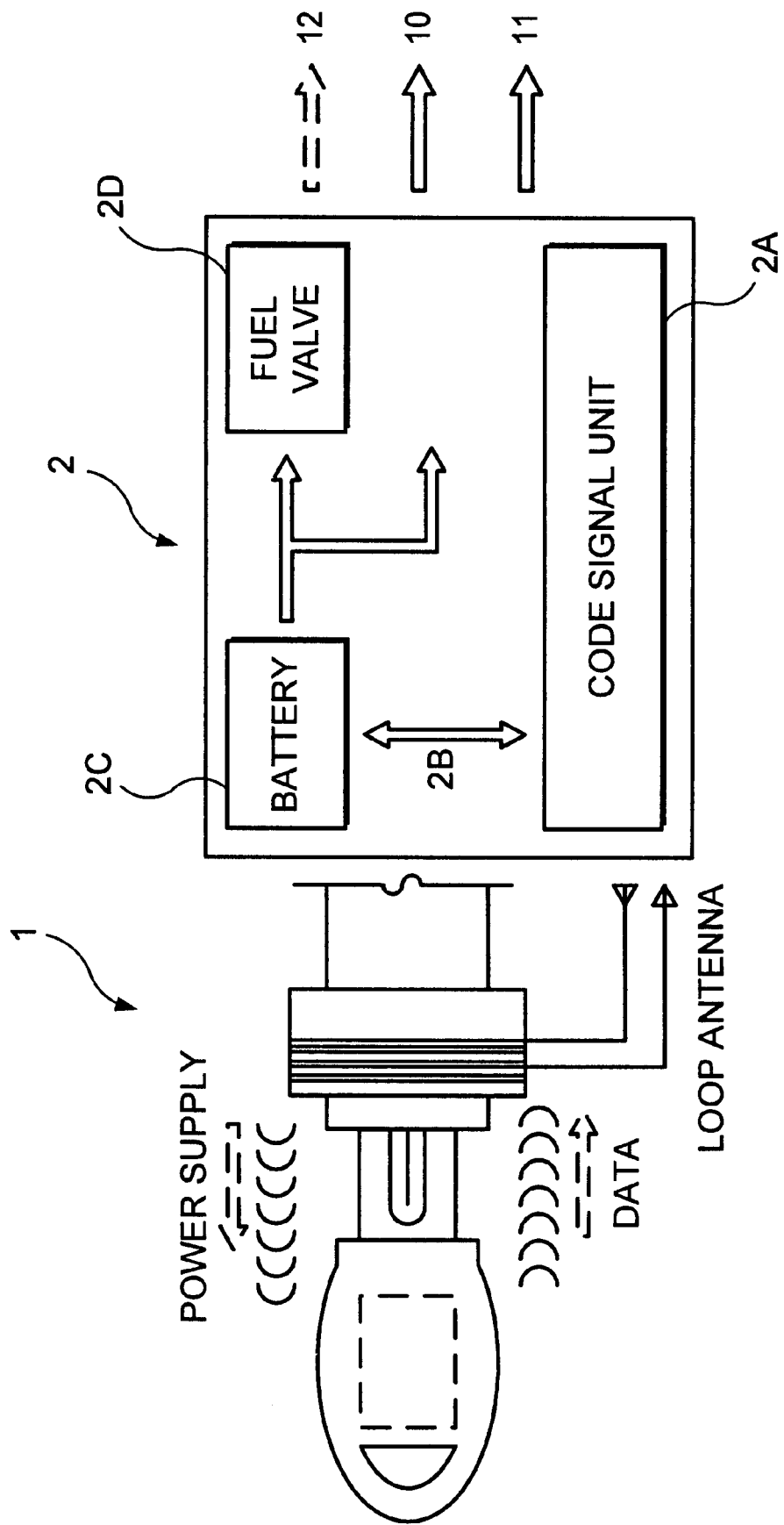
FIG. 1 is a diagrammatic representation of a Battery Power Supply and Fuel Tank Fuel Control Device according to the preferred embodiment of the present invention.

FIG. 1 is a diagrammatic representation of a Battery Power Supply and Fuel Tank Fuel Control Device (2) according to the preferred embodiment of the present invention. The Battery Power Supply and Fuel Tank Fuel Control Device (2) controls power supply directly from the battery and fuel supply directly from the fuel tank of the vehicle The Battery Power Supply and Fuel Tank Fuel Control Device (2) includes a Code Signals Control Unit (2A) which is connected to a Battery Power Supply Control Unit (2C) via the Permitting Code Relay (2B), which can be a wire or other electrical or electronic connection. The Battery Power Supply Control Unit (2C) is in turn connected to the Fuel Tank Fuel Magnetic Valve (2D).

The Code Signals Control Unit (2A) comprises a microprocessor and a memory module having 2 codes, a start-up code and a shut-down code. The microprocessor reads these codes from the said memory module. The Battery Power Supply Control Unit (2C) comprises a microprocessor which activates power supply to the Fuel Tank Fuel Magnetic Valve (2D) upon receiving a permitting code from the Code Signals Control Unit (2A). The Fuel Tank Fuel Magnetic Valve (2D) controls the flow of fuel from the fuel tank (5).

The Code Signals Control Unit (2A) receives start-up code signals from the Start-Up Device (1). The Start-Up Device (1) generates and transmits a start-up code signal to the Code Signals Control Unit (2A). Such transmission can be via a wire connection or wireless using radio frequencies and the like. In FIG. 1, the Start-Up Device (1) is represented as a transponder device which contains a code, which transmits a data signal to the Code Signals Control Unit (2A) via a loop antenna using radio frequencies. Upon receipt of the data transmitted, the Code Signals Control Unit (2A) compares and confirms the signal code with the code stored in its memory module. The Permitting Code Relay (2B) transmits a permitting code to the Battery Power Supply Control Unit (2C) when the Code Signals Control Unit (2A) verifies that the start-up code signal corresponds to the start-up code stored in the memory module.

The Battery Power Supply Control Unit (2C) and Fuel Tank Fuel Magnetic Valve (2D) control power supply from the battery and fuel from fuel tank respectively. If such supplies are stopped, unauthorised start-up and movement of the vehicle is prevented.

When the Battery Power Supply Control Unit (2C) receives a permitting code from the Code Signals Control Unit (2A), the Battery Power Supply Control Unit (2C) will allow power supply to the Fuel Tank Fuel Magnetic Valve (2D), thus enabling fuel from the fuel tank (5) to flow to the electric fuel pump (7). Without the said power supply the fuel supply cannot flow.

At the same time, the Battery Power Supply Control Unit (2C) is also connected to the Engine Control Unit (10), Indication Light (11) and other lights and items (12) concerned with the operation of the motor vehicle. These allow the other parts of the vehicle requiring an electrical supply to function.

Figure 2:
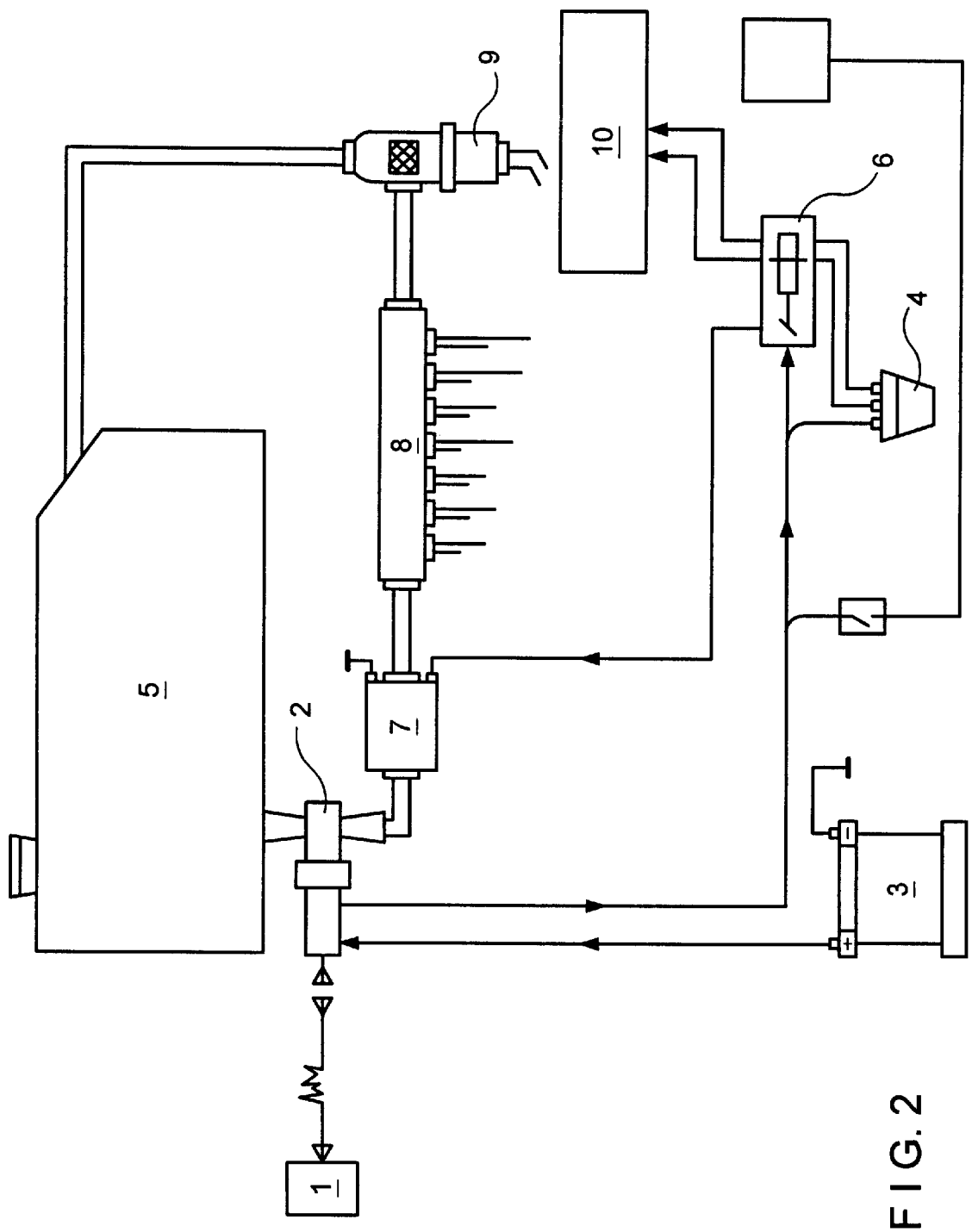
FIG. 2 is a diagrammatic representation of a Battery Power Supply and Fuel Tank Fuel Resistance System according to the preferred embodiment of the present invention, which also illustrates the placement of the Battery Power Supply and Fuel Tank Fuel Control Device of FIG. 1.

FIG. 2 is a diagrammatic representation of a Battery Power Supply and Fuel Tank Fuel Resistance System according to the preferred embodiment of the present invention, which also illustrates the placement of the Power Supply and Fuel Control Device of FIG. 1. The Battery Power Supply and Fuel Tank Fuel Control Device (2), as the primary control device, controls the power supply from the battery (3), and fuel supply from the fuel tank (5) and electric fuel pump (7) and/or oil distribution pipes (8). The Battery Power Supply and Fuel Tank Fuel Control Device (2) also controls power transmission from the battery (3) to the Ignition Starter Switch (4), Main Relay (6), Engine Control Unit (10) and the fuel supply from the Fuel Tank (5) to the engine (not shown).

Figure 3:
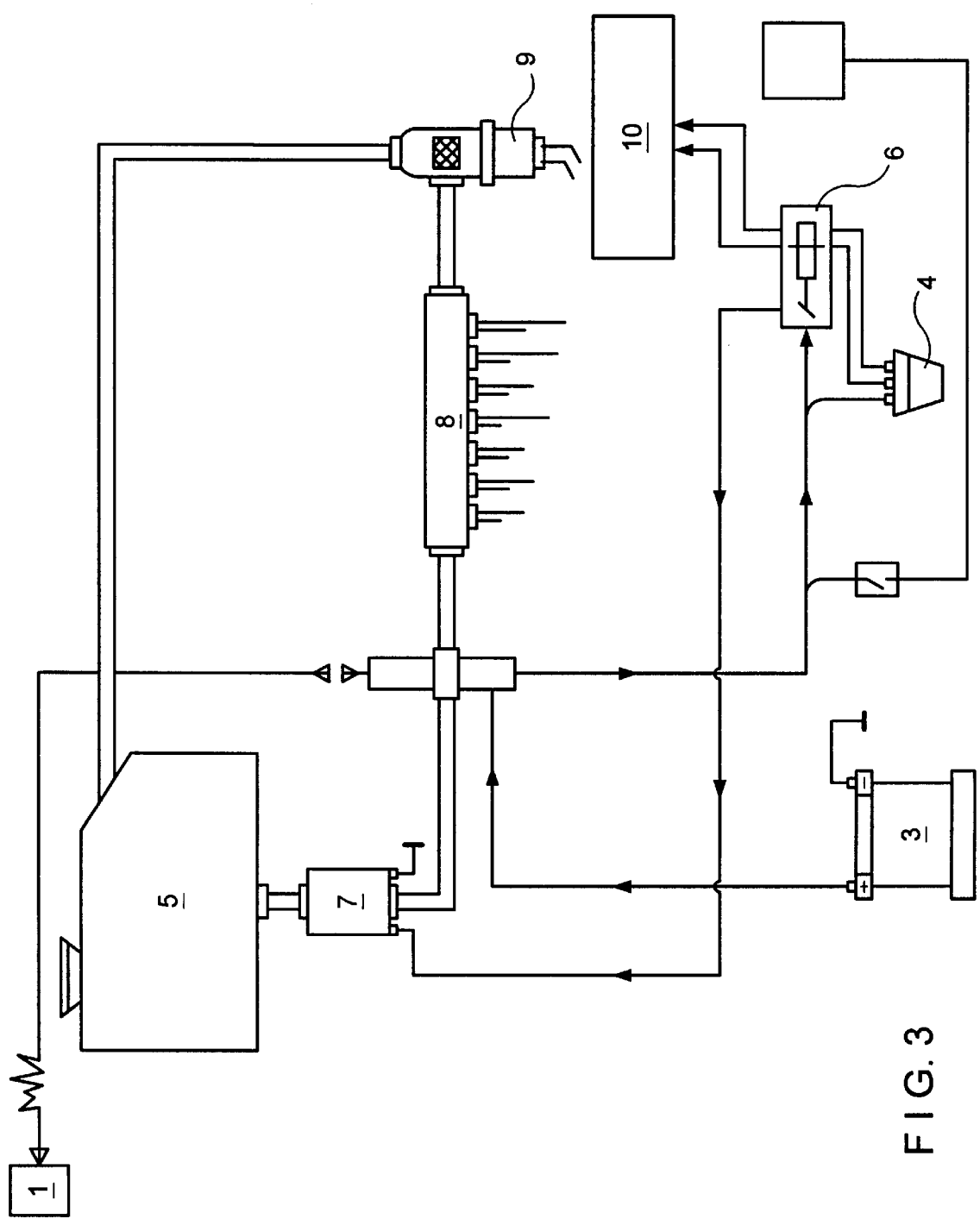
FIG. 3 is a diagrammatic representation of a Battery Power Supply and Fuel Tank Fuel Resistance System according to another preferred embodiment of the present invention, wherein the Battery Power Supply and Fuel Tank Fuel Control Device is connected between an electrical fuel pump and an oil distribution pump.

Preferably, the Battery Power Supply and Fuel Tank Fuel Control Device (2) is installed between the vehicle's fuel tank (5) and its electric fuel pump (7). Alternatively, the Battery Power Supply and Fuel Tank Fuel Control Device (2) is installed between the electric fuel pump (7) and the oil distribution pipes (8) (as in FIG. 3). These particular positions of the Device (2) ensure that the relevant operational parts of the vehicle are not supplied with the requisite power from the battery (3), and fuel from the fuel tank (5), without confirmation by the Battery Power Supply and Fuel Tank Fuel Control Device (2) of the authorised code signals generated by the Start-Up Device (1).

Upon parking the car, a shut-down code is generated via the Start-Up Device (1) and transmitted to the Code Signals Control Unit (2A). Upon receipt of the data transmitted, the Code Signals Control Unit (2A) compares and confirms the signal code with the shut-down code stored in its memory module. The Permitting Code Relay (2B) transmits another code to the Battery Power Supply Control Unit (2C) when the Code Signals Control Unit (2A) verifies that the shut-down code signal corresponds to the shut-down code stored in the memory module.

As can be appreciated from the above description, code signals control the start-up or switch-off of the entire protection system in order to activate the battery power supply and fuel tank's fuel supply to the various parts of the car, a remote control, key, key-pad or transponder apparatus to generate and transmit the signal code may be used. Other methods such as a smart card system, can also be used, depending on the preference of the customer and the state of technology, as long as an appropriate signal can be transmitted to the Code Signals Control Unit (2A) for verification of the access signal.

The system makes it virtually impossible for anyone to tamper with the system by illegitimate re-wiring of the vehicle protection device or by changing of parts of the wiring. Thus the system prevents any illegitimate means of start up and movement of the vehicle. The system is, as a result, more comprehensive, effective and thorough than the prior art.

The invention described herein is susceptible to variations, modifications and/or additions other than those specifically described and it is to be understood that the invention includes all such variations, modifications and/or additions which fall within the spirit and scope of the above description.

PARTS LIST WITH REFERENCE TO THE DRAWINGS

Part No. Description

1 Start-Up Device
2 Batter Power Supply and Fuel Tank Fuel Control Device
2A Code Signal Control Unit
2B Permitting Code Relay
2C Battery Power Supply Control Unit
2D Fuel Tank Fuel Magnetic Valve
3 Battery
4 Ignition Starter Switch
5 Fuel Tank
6 Main Relay
7 Electric Fuel Pump
8 Oil Distribution Pipes
9 Pressure Regulator
10 Engine Control Unit
11 Indication Light
12 Other lights and items

What is claimed is:

1. An anti-theft device (2) for a vehicle, comprising: a valve means (2D) operable to open and close a fuel supply line of a vehicle thereby respectively preventing and permitting fuel flow through said fuel supply line, the valve means (2D) opening in response to an electrical current supply and closing in response to the lack of an electrical current supply; and a control means (2A, 2B, 2C) for selectively enabling and disabling said electrical current supply to the valve means (2D), the control means (2A, 2B, 2C) for enabling said electrical current supply in response to receiving a specific encoded signal, and for disabling said electrical current supply at other times in response to a specific shut-down encoded signal, wherein said electrical current supply can be disabled by said shut-down encoded signal while the ignition of the vehicle is still activated.

2. An anti-theft device (2) according to claim 1, further comprising a fuel supply control line adapted to be disposed in fuel supply line of a vehicle, and wherein the valve means (2D) is arranged to control fuel flow through said fuel supply control line.

3. An anti-theft device (2) according claim 1, wherein the control means (2A,2B,2C) enables said electrical current supply in response to a specific start-up encoded signal.

4. An anti-theft device (2) according to claim 3, wherein the control means (2A,2B,2C) comprises a power control unit (2C) adapted to enable said electrical current supply to the valve means (2D) in response to an activation signal; and an encoded signal control unit (2A) adapted to generate said activation signal and to transmit the activation signal to the power control unit (2C) in response to receiving said specific start-up encoded signal.

5. An anti-theft device (2) according to claim 4, wherein the power control unit (2C) is adapted to disable said electrical current supply to the valve means (2D) in response to a deactivation signal; and the encoded signal control unit (2A) is adapted to generate said deactivation signal and to transmit the deactivation signal to the power control unit (2C) in response to receiving said specific shut-down encoded signal.

6. An anti-theft device (2) according to claim 4, wherein the encoded signal control unit (2A) includes a receiver for receiving an encoded signal, storage means for storing a representation of said specific start-up encoded signal, a comparator for comparing a received signal with the representation of the specific start-up encoded signal in the storage means, and a signal generator for generating the activation signal when the comparator has determined that the received encoded signal is identical to the representation of the specific start-up encoded signal.

7. An anti-theft device (2) according to claim 6, wherein the storage means also stores a representation of said specific shut-down encoded signal, and the comparator also compares the received signal with the representation of the specific shutdown encoded signal in the storage means, and the signal generator generates the deactivation signal when the comparator has determined that the received encoded signal is identical to the representation of the specific shut-down encoded signal.

8. An anti-theft device (2) according to claim 1, wherein the control means (2A,2B,2C) is adapted to be placed in electrical contact with a battery (3) of the vehicle, whereby said electrical current supply is provided by the vehicle battery (3).

9. An anti-theft device (2) according to claim 1, wherein the control means (2A,2B,2C) Is adapted to be placed In electrical communication with at least one other electrically operated component of the vehicle, whereby the control means (2A,2B,2C) can control the electrical current supply to the or each other component.

10. An anti-theft device (2) according to claim 9, wherein the other component is an engine control unit or an indicator light.

11. An anti-theft device (2) according to claim 1 further comprising a tamper-proof housing within which the valve means (2D) and the control means (2A,2B,2C) are housed.

12. An ant-theft device (2) according to claim 1 further comprising a start-up unit (1) for generating and transmitting the specific encoded signal.

13. An ant-theft device (2) according to claim 12, wherein the start-up unit (1) includes a transponder for generating and transmitting the specific encoded signal in the form of a radio wave.

14. A vehicle incorporating an anti-theft device (2) according to claim 1.

15. An anti-theft device (2) according to claim 1, further comprising a start-up unit for selectively generating and transmitting said enabling and disabling signals.

16. An anti-theft device (2) according to claim 15, wherein said start-up unit includes a remote controlled device for generating and transmitting said signals.

17. A method of preventing unauthorized use of a vehicle (2) comprising installing a valve means (2D) in the fuel supply of the vehicle between a fuel tank (5) and an engine of the vehicle, the valve means (2D) being operable, by an electrical current from a battery (3) of the vehicle, to permit fuel flow from the fuel tank (5) to the engine; and controlling the supply of electrical current from the battery (3) to the valve means (2D) such that the supply is only provided in response to a specific encoded signal, whereby fuel can be supplied to the engine only in response to receipt of said specific encoded signal, and the supply can be disabled in response to a specific shut-down signal, whereby the fuel supply is discontinued even though the ignition of the vehicle may still be activated.

18. A method according to claim 17, wherein the electrical supply to at least one other electrical component of the vehicle is also controlled such that the battery (3) is placed in electrical contact with the or each other component only in response to receipt of said specific encoded signal.

* * * * *

UNITED STATES PATENT AND TRADEMARK OFFICE
CERTIFICATE OF CORRECTION

PATENT NO. : 6,424,253 B1
DATED : July 23, 2002
INVENTOR(S) : Zhi Jian Shen

It is certified that error appears in the above-identified patent and that said Letters Patent is hereby corrected as shown below:

<u>Title page,</u>
Item [30], "(CN)" should read -- SG --.

Signed and Sealed this

Twenty-sixth Day of November, 2002

Attest:

JAMES E. ROGAN
Attesting Officer    Director of the United States Patent and Trademark Office